Feb. 9, 1965 P. J. SOCKEL 3,168,813
REVERSING SYSTEM FOR CONDENSER CIRCULATING WATER
Filed Aug. 28, 1961 3 Sheets-Sheet 1
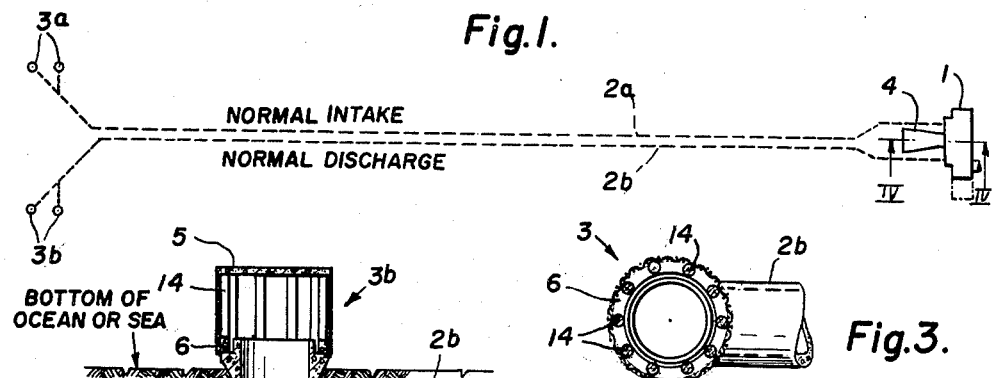
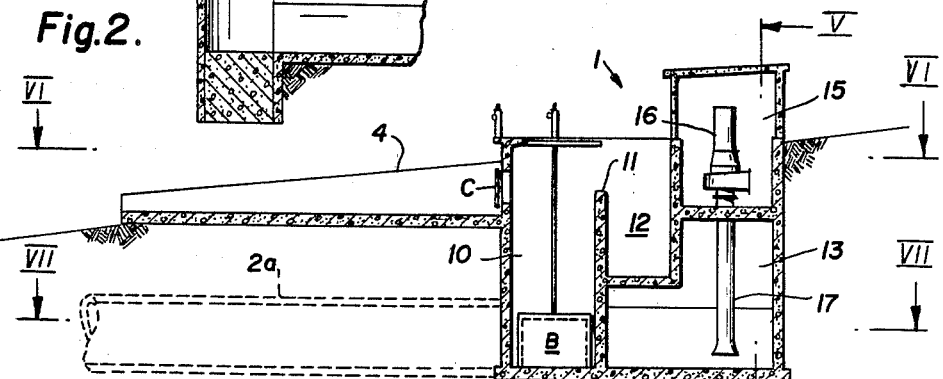
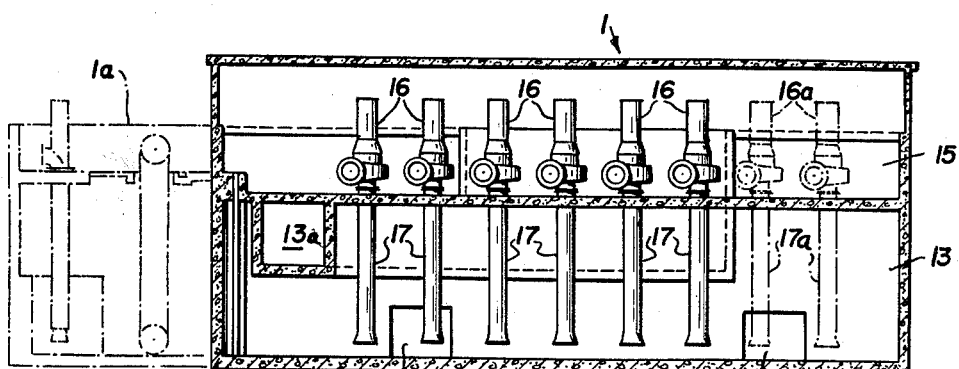
INVENTOR.
PAUL J. SOCKEL
BY
*William J. Ruano*
his ATTORNEY

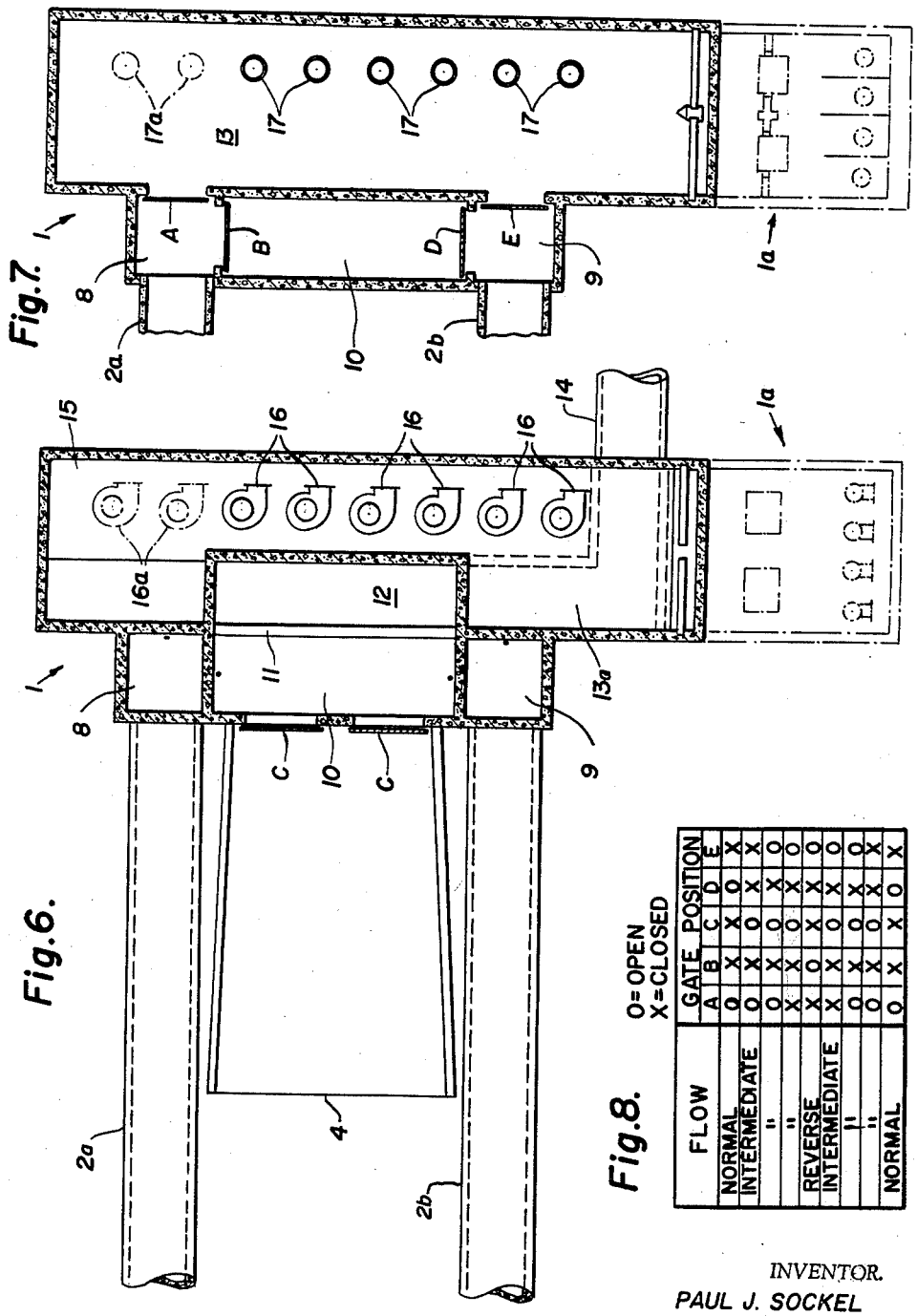

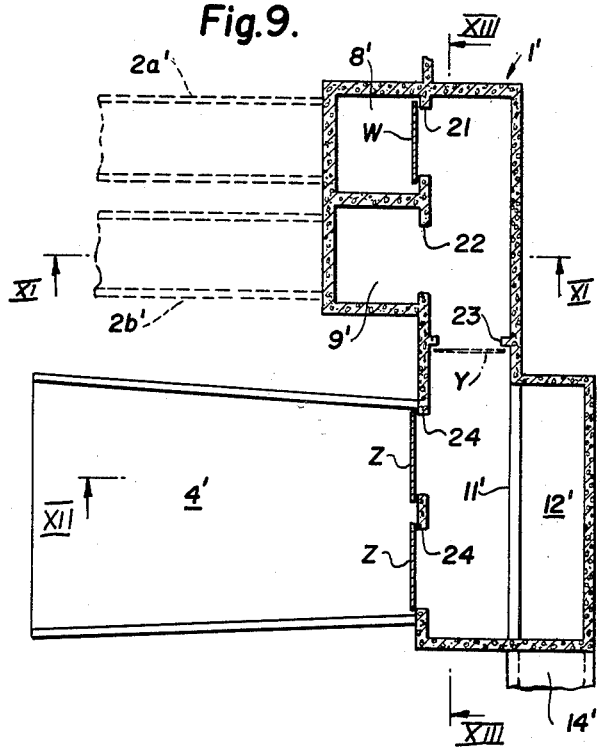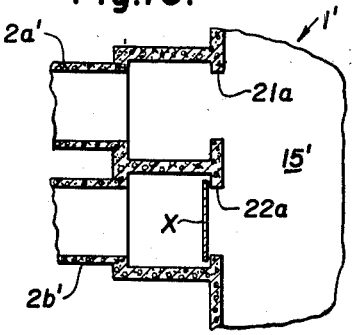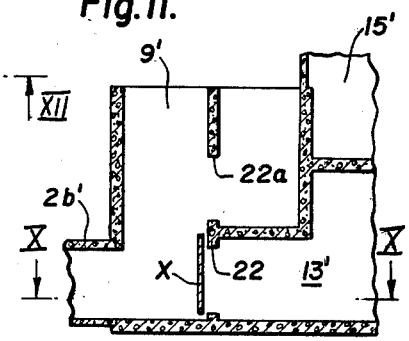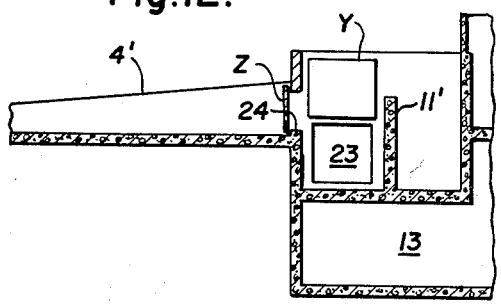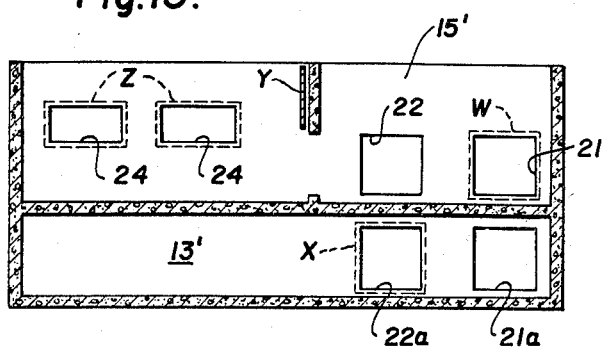

United States Patent Office 3,168,813
Patented Feb. 9, 1965

3,168,813
REVERSING SYSTEM FOR CONDENSER
CIRCULATING WATER
Paul J. Sockel, Reading, Pa., assignor to
Gilbert Associates, Inc., Reading, Pa.
Filed Aug. 28, 1961, Ser. No. 134,455
7 Claims. (Cl. 61—1)

This invention relates to a reversing system for condenser circulating water intake and discharge lines and, more particularly, it relates to gate operating means and means for temporarily diverting the flow of water and controlling the level thereof during operation of the gates to eliminate the tendency for abnormal drawdown in the pump suction chamber which might cause the pump suctions to go dry and result in shut-down of the plant, as well as to eliminate the tendency of an abnormal increase in temperature during the reversing process, as well as serious water hammer and other known disadvantages accompanying conventional condenser circulating water reversing means and procedures.

Where sea water is involved, there is a great tendency for the growth of marine organism of the crustacean and mollusk classes in the inlet line of the condenser which impairs the hydraulic efficiency of the line, thus necessitating periodical shutdowns for manual scraping purposes. These marine organisms can be killed by an increase in water temperature. By alternating flow so that a line is alternately used as an inlet and a discharge line, costly shutdown for maintenance purposes will be obviated. It is often necessary to reverse flow as often as every 12 hours during the active growing season of marine organisms.

When reversals of the normal intake and normal discharge took place, the process was accomplished with four (4) gates, together with a transfer basin. The difficulties with this method resulted from the fact that performance depended entirely on the timing of the gates to prevent loss of suction of the circulating water pumps due to rapid pull down of the water level in the pump suction chamber. The opening of one set of gates had to be simultaneous with the closing of the other set, but regardless of the precision built into this operation, loss of suction with its resultant loss of vacuum was always a threatening possibility. In addition, during this transition of change of flow, there is a period of essentially no flow in the intake or discharge. This is the basic cause of the pull down of level, but it also means this same water is being recirculated through the condensers to the extent that a marked temperature rise occurs in the water entering the condensers. This has reached temperatures 20 degrees above that of normal flow, which is undesirable.

A typical example of the four gate prior art, described above, is shown in Engineering News Record, May 13, 1948, page 65, wherein the graph shows an abnormal increase in water temperature at the inlet condenser and an abnormal decrease in water level in the pump intake basin, threatening loss of the pump suction.

An object of the present invention is to provide a novel reversing system for condenser circulating water which is devoid of the above named disadvantages and which provides an efficient, safe, and very reliable reversal of normal intake and normal discharge cooling water lines devoid of water hammer and having considerably reduced hydraulic impact.

A more specific object of the present invention is to provide a novel gate arrangement and the addition of a surface type discharge flume or equivalent relief discharge means for reversing circulating water to the condenser and which avoids the necessity of simultaneous opening and closing of the various gates to prevent loss of pump suction and the hazard of a complete station shut-down, since it is not affected by any lag of the operation of one or more gates. A further object of the invention is to provide a novel reversing system for condensers wherein the water is temporarily diverted to a surface type discharge flume or equivalent relief discharge means and a means of level control, such as a weir or other sealing means, and wherein the same water is not recirculated through the condensers to the extent that a marked temperature rise occurs in the water entering the condensers, as in conventional systems.

Other objects and advantages will become more apparent from a study of the following description taken with the accompanying drawings wherein:

FIG. 1 is a schematic diagram showing normal intake and normal discharge lines leading from intake and discharge structures 3a and 3b to a circulating water pump chamber 1;

FIG. 2 is an enlarged, vertical, cross-sectional view of the intake and discharge structures 3a and 3b shown in FIG. 1;

FIG. 3 is a horizontal, cross-sectional view taken through the top portion of the structures shown in FIG. 2;

FIG. 4 is an enlarged, vertical, cross-sectional view taken along line IV—IV of FIG. 1 showing a condenser water circulating and reversing system embodying the present invention;

FIG. 5 is a vertical, cross-sectional view taken along line V—V of FIG. 4;

FIG. 6 is a horizontal, cross-sectional view taken along line VI—VI of FIG. 4;

FIG. 7 is a horizontal, cross-sectional view taken along line VII—VII of FIG. 4;

FIG. 8 is a tunnel flow, reversing procedure diagram showing the positions of the gates during different stages of the reversing process;

FIG. 9 is a plan view of a modified form of reversing system employing double acting gates;

FIG. 10 is a fragmentary, cross-sectional view taken along line X—X of FIG. 11;

FIG. 11 is a fragmentary, cross-sectional view taken along line XI—XI of FIG. 9;

FIG. 12 is a fragmentary, vertical, cross-sectional view taken along line XII—XII of FIG. 9;

FIG. 13 is a vertical, cross-sectional view taken along line XIII—XIII of FIG. 9; and, FIG. 14 is a tunnel flow reversing procedure diagram showing the gate positions of the structures shown in FIGS. 9 and 13 inclusive in different stages of the reversal process.

Referring more particularly to FIG. 1 of the drawing, numeral 1 generally denotes a circulating water pump chamber and reversing system for the condenser, embodying the present invention, which system is fed by normal water intake line 2a fed by intake structures 3a, and which discharges through a normal discharge line 2b to discharge structures 3b. The length of the normal intake and normal discharge lines may be of the order of 1800 ft. and the inner diameter of the intake and discharge pipes 2a and 2b may be of the order of 11 ft. although, of course, these dimensions may be varied.

FIGS. 2 and 3 show the construction of the discharge structure 3b which is the same as the intake structure 2a, shown in FIG. 1, and comprises a concrete cylindrical base having a base ring 6 on which are mounted concrete posts 14 between which sea water enters. Mounted on the posts 14 is a concrete cover 5. Water from the sea, will flow through the intake structure and normal intake pipe 2a to structure 1.

Referring more particularly to FIGS. 4 and 5, numeral 1 generally denotes a concrete structure for the cirulating water pump chamber and reversing means embodying the present invention. Contained in structure 1 is a reversing chamber 10, defined on one side by weir 11, on the other side of which weir is a sealing chamber 12. A discharge flume 4 extends from the top portion of the wall of the reversing chamber 10, onto which water is discharged through a gate C. The flume is higher than the highest tide elevation.

A circulating water pump chamber 13 is provided into which project a plurality of circulating water pump tubes 17 extending from circulating water pumps 16. Within chambers 15 and 17, additional pumps 16a and tubes 17a, shown in dot and dash lines, may be added later when needed.

FIGS. 6 and 7 show more clearly the positions of the five gates A, B, C, D and E.

In operation, reference is made to FIG. 8 which is a flow diagram, showing the positions of the various gates A to E, inclusive, in successive stages of the reversing process. The letter O indicates an open gate and the letter X, a closed gate. It will be seen, therefore, that normally, gates A and D are open while B, C, and E are closed whereupon water flows in from normal intake line 2a, tunnel 8, through gate A into pump chamber 13, through pump tubes 17, discharged by pumps 16 to the condenser and back through line 14, tunnel 13a, into the sealing chamber 12, over the weir 11, into reversing chamber 10, through gate D, tunnel 9 and normal outlet pipe 2b. In the intermediate position, gates C are then opened and as gate D is gradually closed, the discharge water will begin to divide itself between flowing through gate D and gates C until gate D is closed and all discharge flow will pass through gates C to flume 4. This gradual change reduces shock on gate D. In the next step, gate E is opened which now establishes, in a gradual manner, a reversal of flow in what was the discharge line 2b. Now both lines 2a and 2b serve as intakes with intake water passing through gates A and E into pump chamber 13, through pump tubes 17, discharged by pumps 16 to the condenser and back through line 14, tunnel 13a, into sealing chamber 12, over weir 11, into reversing chamber 10, through gates C to flume 4. Then in the last phase of the intermediate position, at a later time, since time is not cirtical in opening or closing gates, gate A is closed. This establishes full flow into the pump chamber 13 through line 2b and the discharge is still through gates C to the surface flume 4. Then gate B is opened and the discharge water divides itself between the discharge flume 4 and line 2a. When gates C are closed, normal intake line 2a becomes a discharge line and normal discharge line 2b becomes an intake line with full flow passing through this line. The intake flow at this time would then be through line 2b, tunnel 9, gate E into pump chamber 13, through pump tubes 17, discharged by pump 16 to the condenser and back through line 14, tunnel 13a into the sealing chamber, over the weir 11, into the reversing chamber 10, through gate B, tunnel 8 and line 2a. The growth of marine organism of the Crustacean and Mollusk classes can then be killed, either by the increase in water temperature or chemical means, and flushed out of the normal intake line. Thereafter, gates C are opened and gate B is closed. And still later gate A is opened, and still later, gate E is closed until finally, the normal position is obtained wherein gates B, C, and E are closed, whereas gates A and D are open.

The modification shown in FIGS. 9 to 14 inclusive embodies two double acting gates W and X in place of four single acting gates A, B, D and E shown in FIGS. 4 to 7, inclusive. Thus the modification enables a reduction in the number of gates. Such double acting gates move from lower ports 21a and 22a to upper ports 21 and 22 (see FIG. 13), therefore each gate serves a dual function in selectively closing two different openings arranged in stacked relationship.

Such double acting gate construction results in a more condensed layout since the intake and discharge lines 2a' and 2b' may be brought close together, rather than being spread apart as shown in FIG. 6. This provides the outstanding advantage of a smaller overall required space, therefore considerably reducing the cost of construction, since, for example, only one ditch a little wider than normal for one pipe need be excavated to place the two lines 2a' and 2b' together. Two gates Z, instead of one, are shown in FIG. 9, principally for greater capacity of flow onto discharge flume, as is shown in the construction illustrated in FIG. 6. Gate X operates gate openings 22 and 22a; gate W operates openings 21 and 21a; the two gates Z operate openings 24; and gate Y operates opening 23.

In principle, the modification shown in FIGS. 9 to 14 inclusive, is the same as that shown in FIGS. 1 to 8 inclusive, in that there is provided a discharge flume and a means for level control, such as a weir or other method of sealing—the variation being principally in the method of gate control for the intake and discharge lines. All the advantages possessed by the construction shown in FIGS. 1 to 8 inclusive are also inherent in the operation of the system shown in FIGS. 9 to 14, inclusive.

In operation, reference is made to the flow diagram shown in FIG. 14 illustrating the positions of the various gates openings 21, 21a, 22, 22a, 23 and 24 for the normal, intermediate and reverse positions when it is desired to reverse the flow of cooling water through the condenser. Since FIG. 14 is self explanatory as to the successive positions of the various gate openings, further description thereof is deemed unnecessary. It will be noted, as before, that the cooling water is temporarily diverted through gates Z onto the discharge flume during reversal and that the weir 11' provides level control.

It should be understood that the weir 11 shown in FIG. 4 as well as weir 11' shown in FIG. 12 may not be necessary in certain installations where the plant is located at a sufficiently low level. That is, a weir is necessary only for a high level installation, as illustrated in the present drawings. The double acting gate construction is especially useful for a high level plant installation.

Thus it will be seen that I have provided an efficient reversing system for condenser circulating water in which there is no appreciable change in suction head of the pumps at any time—also wherein, except for the water in the line used for discharge prior to a reversal, there is essentially no recirculation with its resultant higher temperature in the condenser, due to the suction head being maintained at all times with a constant flow of incoming water; also I have provided a reversing system wherein no critical simultaneous operation of gates is necessary with the attendant hazard resulting from variations due to mechanical difficulties, and wherein in the event of low water or flow difficulties in the pipes, both lines may be used as intakes and the surface flume as a discharge; furthermore, I have provided a system which has no water hammer or impact due to change of flow inasmuch as by timed control the reversing process can be made extremely gradual particularly as a direct benefit from the use of the additional gate which discharges water on the surface discharge flume, and wherein reduced hydraulic impact results in less maintenance on the gates, a more uniform loading on the gate drives which affords less wear on the mechanisms and which minimizes the chance of damaging the pipe joint; furthermore, I have provided a condenser reversing system which is most readily adaptable to automatic sequential control with gate position interlocks, since the timing of the steps is definitely not critical and satisfactory operation would prevail no matter where the sequence has stopped during the transition of a reversal in either direction—and which reversing process provides a far greater assurance of continuity of service and minimizes losses due to increased cooling water temperatures—and which system is highly effective for preventing pull-down and loss of suction of the circulating water pumps and thus completely eliminates the hazard of a complete station shutdown.

While I have illustrated and described several embodiments of my invention, it will be understood that these are by way of illustration only, and that various changes and modifications may be made within the contemplation of my invention and within the scope of the following claims.

I claim:

1. A reversing system for a condenser circulating water system, comprising a pump chamber having pumping means and pump tube means for circulating cooling water from said pump chamber to the condenser, a water intake line and a water discharge line connecting a large body source of cooling water to said pump chamber, a plurality of gates between said lines and said pump chamber a reversing chamber having gates for by-passing the flow through said water intake and water discharge lines, a sealing chamber having a connection to a return line from the condenser, a weir connecting said reversing and sealing chamber to effect reversal of flow of water from said source through said intake and discharge lines, and relief discharge means comprising a surface discharge flume on one wall of said reversing chamber and including a gate leading from said reversing chamber to said flume through which circulating water is temporarily diverted during said reversal of flow so as to safeguard against shut-down which might occur from abnormal drawdown in said pump chamber during said reversal of flow.

2. A reversing system for a circulating system for a condenser in a plant, comprising a pump chamber, a plurality of pumps in said chamber, each pump having a tube for circulating cooling water into a line leading to the condenser, a separate reversing chamber into which water returning from the condenser is discharged, a natural body of water, a water intake line and a water discharge line connecting said body of water to said pump chamber, said lines each connected to the reversing chamber, a plurality of gates between said lines and said pump chamber and between said lines and said reversing chamber, means for successively operating said gates in a manner so as to effect gradual reversal of flow of said natural body of water through said intake and discharge lines, relief discharge means comprising a surface discharge flume connected by a gate to said reversing chamber, and said gate movable from closing a port between said reversing chamber and said relief discharge means through which circulating water is temporarily diverted during said reversal of flow so as to safeguard the plant against shut-down which would otherwise occur from abnormal drawdown in said pump chamber during said reversal of flow.

3. A reversing system as recited in claim 2 wherein said gate operating means and certain of said gates initially converts said discharge line into an intake line, whereby both lines initially act as intake lines to said discharge flume during reversal.

4. A reversing system as recited in claim 2 together with a weir confronting said last mentioned gate, and a sealing chamber on one side of said weir.

5. A reversing system as recited in claim 2 wherein said gates for reversing flow comprise ports in vertically stacked relationship and a single vertically movable gate for selectively closing one port while opening the other.

6. A reversing system for a condenser circulating water system in an industrial plant, comprising a pump chamber, pumping means in said chamber for circulating cooling water to the condenser, water intake and water discharge lines connecting a natural body of water to said pump chamber, each of said lines having a separate port to said chamber, a reversing chamber adjacent the pump chamber and having a separate port therein to each of said lines, gates movable to close each of said ports to effect progressive reversal of flow of cooling water through said intake and discharge lines, a sealing chamber immediately adjacent said pump chamber and being connected to a return line from said condenser, a wall of said sealing chamber defining a discharge weir over which water discharges into said reversing chamber, a surface discharge flume immediately adjacent a discharge opening in said reversing chamber, and a closure member movable from a position closing said opening for temporarily diverting water from said reversing chamber to said surface discharge flume during said reversal of flow so as to safeguard the plant against shut-down which would otherwise occur from abnormal drawdown in said pump chamber during said reversal of flow.

7. A reversing system as recited in claim 6 wherein each of said gates alternatively close one of two ports positioned one above the other in vertically stacked relationship whereby a single vertically movable gate selectively closes one port while opening the other of said two ports.

References Cited by the Examiner
UNITED STATES PATENTS
2,507,594   5/50   Hendrixson _____ 137—599

OTHER REFERENCES

Engineering News Record, pp. 64–67, May 13, 1948. (Copy in Scientific Library.)

EARL J. WITMER, *Primary Examiner.*
WILLIAM I. MUSHAKE, JACOB L. NACKENOFF,
*Examiners.*